(12) United States Patent
Li et al.

(10) Patent No.: US 9,560,547 B2
(45) Date of Patent: Jan. 31, 2017

(54) SYSTEM FOR IMPLEMENTING MULTIPLE RADIO ACCESS NETWORKS (RANS) CONVERGENCE AND METHOD THEREOF

(71) Applicant: Huawei Technologies Co., Ltd., Shenzhen, Guangdong (CN)

(72) Inventors: Bingzhao Li, Shenzhen (CN); Yanyan Chen, Shenzhen (CN); Chunchun Lv, Shenzhen (CN); Qucai Chen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 153 days.

(21) Appl. No.: 13/750,233

(22) Filed: Jan. 25, 2013

(65) Prior Publication Data

US 2013/0136025 A1   May 30, 2013

Related U.S. Application Data

(63) Continuation of application No. PCT/CN2011/074791, filed on May 27, 2011.

(30) Foreign Application Priority Data

Jul. 26, 2010 (CN) .......................... 2010 1 0246658

(51) Int. Cl.
*H04W 28/02* (2009.01)
*H04W 28/18* (2009.01)
(Continued)

(52) U.S. Cl.
CPC ......... *H04W 28/0268* (2013.01); *H04W 28/18* (2013.01); *H04W 48/18* (2013.01); *H04W 76/02* (2013.01)

(58) Field of Classification Search
None
See application file for complete search history.

(56) References Cited

U.S. PATENT DOCUMENTS 6,889,050 B1 * 5/2005 Willars et al. ............. 455/452.2
7,362,726 B2 * 4/2008 Petrovic et al. ............. 370/329
(Continued)

FOREIGN PATENT DOCUMENTS

CN   1783876 A   6/2006
CN   1839653 A   9/2006
(Continued)

OTHER PUBLICATIONS

Extended European Search Report in corresponding European Patent Application No. 11789153.1 (Sep. 10, 2013).
(Continued)

*Primary Examiner* — Huy D Vu
*Assistant Examiner* — Hong Shao
(74) *Attorney, Agent, or Firm* — Leydig, Voit & Mayer, Ltd.

(57) ABSTRACT

Provided are a system for implementing multiple Radio Access Networks (RANs) convergence and a method thereof in the present invention. The method includes: an anchor RAN establishes a connection with a User Equipment (UE); the anchor receives a RAB establishment request from a Core Network (CN); the anchor RAN selects an auxiliary RAN; the anchor RAN sends quality of service (QoS) parameters to the auxiliary RAN, so that the auxiliary RAN establishes a connection with the UE according to the QoS parameters, while the anchor RAN keep the connection with the UE. With the methods provided in embodiments for the present invention, multiple RANs convergence is implemented, and the UE establishes connections with the anchor (Continued)

RAN and the auxiliary RAN at the same time, so as to improve the peak rate of the UE.

56 Claims, 11 Drawing Sheets

(51) Int. Cl.
*H04W 48/18* (2009.01)
*H04W 76/02* (2009.01)

(56) References Cited

U.S. PATENT DOCUMENTS

| | | | |
|---|---|---|---|
| 7,539,160 B2* | 5/2009 | Virtanen et al. | 370/329 |
| 2003/0223450 A1 | 12/2003 | Bender et al. | |
| 2007/0207770 A1 | 9/2007 | Ikaheimo et al. | |
| 2008/0069088 A1* | 3/2008 | Petrovic et al. | 370/354 |
| 2008/0220787 A1* | 9/2008 | Stanwood et al. | 455/450 |
| 2009/0316664 A1 | 12/2009 | Wu | |
| 2010/0091653 A1* | 4/2010 | Koodli et al. | 370/235 |
| 2010/0128697 A1* | 5/2010 | Choi-Grogan | H04W 36/0044 370/332 |
| 2012/0115436 A1 | 5/2012 | Dai et al. | |
| 2012/0202500 A1 | 8/2012 | Wu | |
| 2012/0307741 A1 | 12/2012 | Wu | |

FOREIGN PATENT DOCUMENTS

| | | |
|---|---|---|
| CN | 101516066 A | 8/2009 |
| CN | 101616411 A | 12/2009 |
| CN | 101626596 A | 1/2010 |
| CN | 101720117 A | 6/2010 |
| CN | 101730179 A | 6/2010 |
| CN | 101945435 A | 1/2011 |
| CN | 101965064 A | 2/2011 |
| EP | 1693994 A1 | 8/2006 |
| EP | 2170002 A2 | 3/2010 |
| WO | WO 2010022374 A1 | 2/2010 |

OTHER PUBLICATIONS

Ahmed et al., "Multi Access Data Network Connectivity and IP Flow Mobility in Evolved Packet System (EPS)," 2010, IEEE, New York, New York.

Written Opinion of the International Searching Authority in corresponding PCT Patent Application No. PCT/CN2011/074791 (Sep. 8, 2011).

International Search Report in corresponding PCT Patent Application No. PCT/CN2011/074791 (Sep. 8, 2011).

Office Action in corresponding Chinese Patent Application No. 201410223287.4 (Nov. 30, 2016).

* cited by examiner

SYSTEM FOR IMPLEMENTING MULTIPLE RADIO ACCESS NETWORKS (RANS) CONVERGENCE AND METHOD THEREOF

CROSS-REFERENCE TO RELATED APPLICATIONS

This application is a continuation of International Patent Application No. PCT/CN2011/074791, filed on May 27, 2011, which claims priority to Chinese Patent Application No. 201010246658.2, filed on Jul. 26, 2010, both of which are hereby incorporated by reference in their entireties.

FIELD OF THE INVENTION

Embodiments of the present invention relate to communications technology, and more particularly to a system for implementing a plurality of radio access networks (abbreviated as "RAN") convergence, a method thereof, and an access network element.

BACKGROUND OF THE INVENTION

The multi-carrier convergence technology is introduced in all of the universal mobile telecommunications system (Universal Mobile Telecommunications System, abbreviated as "UMTS"), 3GPP Long Term Evolution (Long Term Evolution, abbreviated as "LTE") and code division multiple access (Code Division Multiple Access, abbreviated as "CDMA") 200 network to enhance the peak rate of user equipment (user equipment, abbreviated as "UE"). With the increase in number of carrier convergences, the peak rate of the UE will arrive at another bottleneck.

Accordingly, it is a problem urgently needed to be solved as how to further enhance the peak rate of the UE.

SUMMARY OF THE INVENTION

Various aspects of the present invention provide systems for implementing a plurality of RANs convergence, methods thereof, and access network elements, whereby it is made possible for the UE to simultaneously communicate with at least two RANs, thereby improving the peak rate of the UE.

One aspect of the present invention provides a method for implementing a convergence system of a plurality of radio access networks, which method comprises an anchor radio access network establishing a connection with a user equipment; the anchor receiving a radio access bearer establishment request transmitted from a core network; the anchor radio access network selecting an auxiliary radio access network; the anchor radio access network sending quality of service parameters to the auxiliary radio access network, so that the auxiliary radio access network establishes a connection with the user equipment according to the quality of service parameters, while the anchor radio access network keeps the connection with the user equipment.

Another aspect of the present invention further provides a method for implementing a convergence system of a plurality of radio access networks, which method comprises an auxiliary radio access network receiving quality of service parameters transmitted from an anchor radio access network that has already established a connection with a user equipment; and the auxiliary radio access network establishing a connection with the user equipment according to the quality of service parameters.

Still another aspect of the present invention further provides a method for transmitting data for a convergence system of a plurality of radio access networks implemented on the basis of the foregoing methods, which method comprises an anchor radio access network receiving a packet transmitted from a user equipment; and the anchor radio access network merging the received packet transmitted from the user equipment with a packet transmitted from an auxiliary radio access network after the packet having been transmitted by the user equipment to the auxiliary radio access network, and transmitting the merged packet to a core network.

Yet another aspect of the present invention further provides a method for transmitting data for a convergence system of a plurality of radio access networks implemented on the basis of the foregoing methods, which method comprises an anchor radio access network receiving a packet transmitted from a core network; and the anchor determining a size of a packet determined to be assigned to an auxiliary radio access network, dividing the received packet, transmitting to the auxiliary radio access network the packet determined to be assigned to the auxiliary radio access network, and transmitting to a user equipment the packet determined to be assigned to itself.

A further aspect of the present invention further provides a releasing method for a convergence system of a plurality of radio access networks implemented by using the foregoing methods, which method comprises an anchor radio access network transmitting a release request message to an auxiliary radio access network; the anchor radio access network receiving a release response message transmitted from the auxiliary radio access network; and the anchor radio access network transmitting a bearer release message to a user equipment, instructing the user equipment to release bearer of the auxiliary radio access network.

A still further aspect of the present invention further provides a releasing method for a convergence system of a plurality of radio access networks implemented by using the foregoing methods, which method comprises an anchor radio access network transmitting a release request message to an auxiliary radio access network; the anchor radio access network receiving a release response message transmitted from the auxiliary radio access network, the release response message including a radio resource connection release message generated by the auxiliary radio access network; and the anchor radio access network transmitting the radio resource connection release message to a user equipment via direct transfer signaling.

A yet further aspect of the present invention further provides a releasing method for a convergence system of a plurality of RANs implemented by using the foregoing methods, which method further comprises an anchor radio access network transmitting a release request message to an auxiliary radio access network; and the auxiliary radio access network transmitting a release response message to the anchor radio access network, and transmitting the release request message to a user equipment.

Another aspect of the present invention further provides an anchor radio access network element, which comprises an establishing module configured to establish a connection with a user equipment; a first receiving module configured to receive a radio access bearer establishment request transmitted from a core network; a selecting module configured to select an auxiliary radio access network; and a first processing module configured to transmit quality of service parameters to the auxiliary radio access network, so that the auxiliary radio access network establishes a connection with the user equipment according to the quality of service parameters, and the connection with the user equipment is kept after the auxiliary radio access network has established the connection with the user equipment.

Still another aspect of the present invention further provides an auxiliary radio access network element, which comprises a third receiving module configured to receive quality of service parameters transmitted from an anchor radio access network that has already established a connection with a user equipment; and a second processing module configured to establish connection with the user equipment according to the quality of service parameters.

Yet another aspect of the present invention further provides a convergence system of a plurality of radio access networks, which system comprises the aforementioned anchor radio access network element and the aforementioned auxiliary radio access network element.

In the embodiments of the present invention, first the anchor RAN establishes a connection with the UE, and after receiving a radio access bearer (RAB) establishment request transmitted from a core network (CN), the anchor RAN selects an auxiliary RAN, and transmits quality of service (QoS) parameters to the auxiliary RAN, so that the auxiliary RAN establishes a connection with the UE according to the QoS parameters, and the anchor RAN keeps the connection with the UE after the auxiliary RAN has established the connection with the UE. Thus, multiple RANs convergence is implemented, and the UE establishes connections with the anchor RAN and the auxiliary RAN at the same time, so as to improve the peak rate of the UE.

BRIEF DESCRIPTION OF THE DRAWINGS

To make clearer the explanation of technical solutions of the embodiments of the present invention or of the prior art, accompanying drawings needed in the description of the embodiments or the prior art are briefly illustrated below. Apparently, the accompanying drawings illustrated below are merely directed to some embodiments of the present invention, and it is possible for persons ordinarily skilled in the art to deduce other drawings from these drawings without creative effort.

DETAILED DESCRIPTION OF THE EMBODIMENTS

To make clearer the objectives, technical solutions, and advantages of the embodiments of the present invention, the technical solutions according to the embodiments of the present invention will be clearly and completely described below with reference to the accompanying drawings. Apparently, the embodiments as described below are merely partial, rather than entire, embodiments of the present invention. On the basis of the embodiments of the present invention, all other embodiments obtainable by persons ordinarily skilled in the art without creative effort shall all fall within the protection scope of the present invention.

Figure 1:
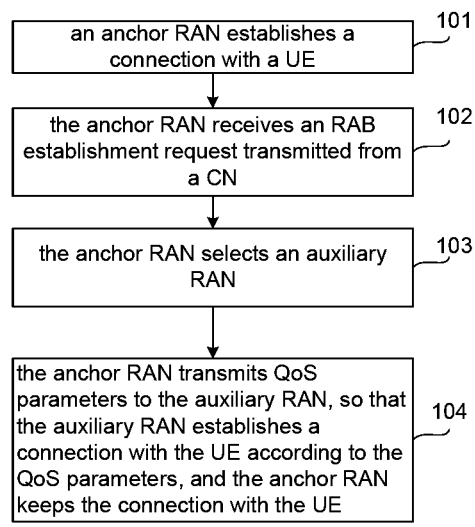
FIG. 1 is a flowchart exemplarily illustrating a method for implementing a convergence system of a plurality of RANs according to one embodiment of the present invention.

FIG. 1 is a flowchart exemplarily illustrating a method for implementing a convergence system of a plurality of RANs according to one embodiment of the present invention.

101—an anchor RAN establishes a connection with a UE.

102—the anchor RAN receives an RAB establishment request transmitted from a CN.

103—the anchor RAN selects an auxiliary RAN. The auxiliary RAN may employ an accessing technique different from that employed by the anchor RAN or identical with that employed by the anchor RAN.

104—the anchor RAN transmits quality of service (abbreviated as "QoS") parameters to the auxiliary RAN, so that the auxiliary RAN establishes a connection with the UE according to the QoS parameters, and the anchor RAN keeps the connection with the UE, i.e. the anchor RAN does not release the connection with the UE after the auxiliary RAN has established the connection with the UE.

Through 101 to 104, the anchor RAN and at least one auxiliary RAN simultaneously establish connections with the UE, namely is realized the convergence of at least two RANs.

Figure 2:
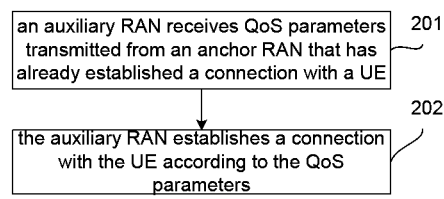
FIG. 2 is a flowchart exemplarily illustrating a method for implementing a convergence system of a plurality of RANs according to another embodiment of the present invention.

FIG. 2 is a flowchart exemplarily illustrating a method for implementing a convergence system of a plurality of RANs according to another embodiment of the present invention.

201—an auxiliary RAN receives QoS parameters transmitted from an anchor RAN that has already established a connection with a UE. The auxiliary RAN may employ an accessing technique different from that employed by the anchor RAN or identical with that employed by the anchor RAN.

202—the auxiliary RAN establishes a connection with the UE according to the QoS parameters.

Figure 3:
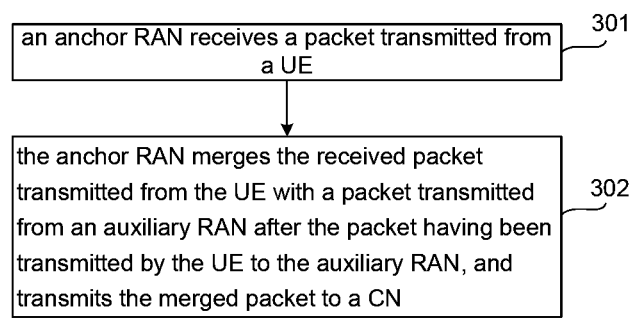
FIG. 3 is a flowchart exemplarily illustrating a method for transmitting data based on a convergence system of a plurality of RANs according to another embodiment of the present invention.

FIG. 3 is a flowchart exemplarily illustrating a method for transmitting data based on a convergence system of a plurality of RANs according to another embodiment of the present invention.

301—an anchor RAN receives a packet transmitted from a UE.

302—the anchor RAN merges the received packet transmitted from the UE with a packet transmitted from an auxiliary RAN after the packet having been transmitted by the UE to the auxiliary RAN, and transmits the merged packet to a CN.

Figure 4:
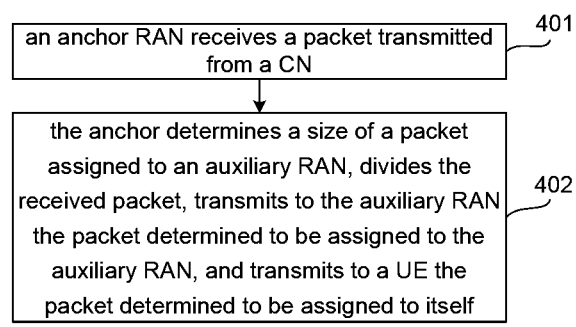
FIG. 4 is a flowchart exemplarily illustrating a method for transmitting data based on a convergence system of a plurality of RANs according to another embodiment of the present invention.

FIG. 4 is a flowchart exemplarily illustrating a method for transmitting data based on a convergence system of a plurality of RANs according to another embodiment of the present invention.

401—an anchor RAN receives a packet transmitted from a CN.

402—the anchor determines a size of a packet assigned to an auxiliary RAN, divides the received packet, transmits to the auxiliary RAN the packet determined to be assigned to the auxiliary RAN, and transmits to a UE the packet determined to be assigned to itself.

Figure 5:
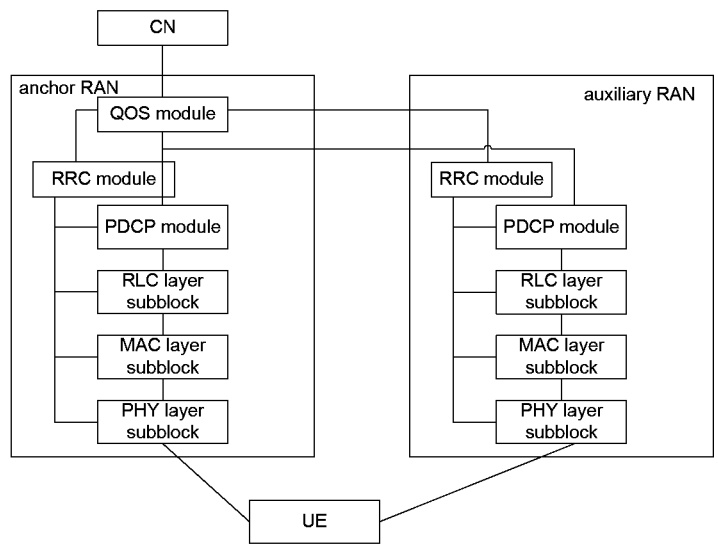
FIG. 5 is a schematic diagram exemplarily illustrating the principles of a method for implementing convergence of a plurality of RANs and a method for transmitting data according to another embodiment of the present invention.

FIG. 5 is a schematic diagram exemplarily illustrating the principles of a method for implementing convergence of a plurality of RANs and a method for transmitting data according to another embodiment of the present invention. In the various embodiments of the present invention, the UE communicates with at least two RANs, one of which is an anchor RAN, and the remaining one in the at least two RANs besides the anchor RAN is an auxiliary RAN (also referred to as "secondary RAN"). The anchor RAN communicates with a core network (abbreviated as "CN"). The auxiliary RAN can either directly communicate with the UE or communicate with the UE via the anchor RAN.

In the embodiments of the present invention, the RANs participating in the convergence may include a radio resource control (abbreviated as "RRC") module and a user interface processing module.

The RRC module is responsible configured to map QoS parameters needed by the service into radio resource allocation, and manage the radio resource between the UE and the RANs.

The user interface processing module may include one or more of the following modules: namely a packet data convergence protocol (abbreviated as "PDCP") module, a radio link control (abbreviated as "RLC") layer subblock, a media access control (abbreviated as "MAC") layer subblock and a physical (abbreviated as "PHY") layer subblock, etc., which are responsible for data processing at the user interface, for compressing, segmenting and recombining IP packets, and for selecting physical channels to transmit packets.

The anchor RAN receives QoS parameters of a service from the CN, divides the QoS parameters, and transmits the divided QoS parameters to the auxiliary RAN, whereupon the auxiliary RAN can establish a connection with the UE according to these QoS parameters.

After the auxiliary RAN has established the connection with the UE, the anchor RAN distributes downlink packets received from the CN to itself and other auxiliary RANs, merges uplink packets received by itself and other auxiliary RANS and then transmits the merged packets to the CN.

Figure 6:
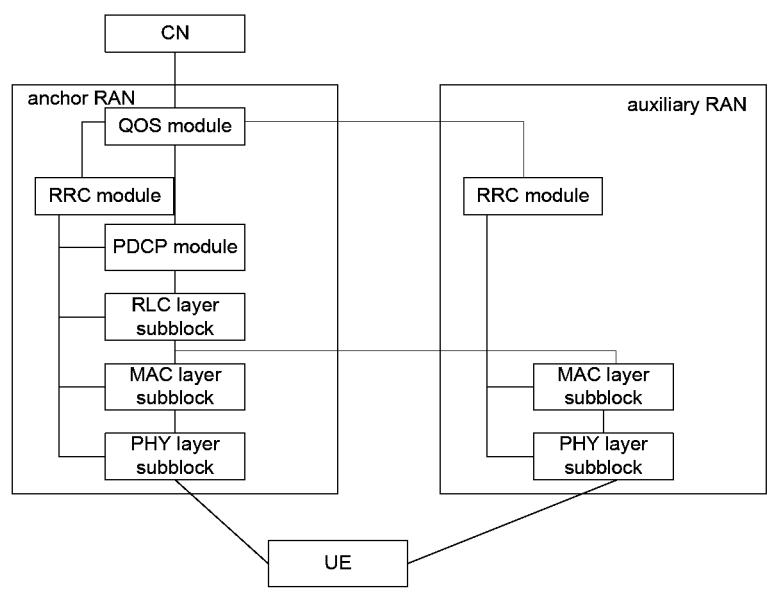
FIG. 6 is another schematic diagram exemplarily illustrating the principles of a method for implementing a convergence system of a plurality of RANs and a method for transmitting data according to another embodiment of the present invention.

FIG. 6 is another schematic diagram exemplarily illustrating the principles of a method for implementing a convergence system of a plurality of RANs and a method for transmitting data according to another embodiment of the present invention. In this embodiment, the anchor RAN includes a QoS module, an RRC module, a PDCP module, an RLC layer subblock, an MAC layer subblock and a PHY layer subblock, and the auxiliary RAN includes an RRC module, an MAC layer subblock and a PHY layer subblock. The auxiliary RAN cannot perform RLC processing and PDCP processing, because the auxiliary RAN does not include any RLC layer subblock and PDCP module, and data in the auxiliary RAN has to be performed with RLC processing and PDCP processing by the anchor RAN. This is equivalent to say that the RLC layer subblock and the PDCP module in the anchor RAN are commonly used by the anchor RAN and the auxiliary RAN.

In another embodiment of the present invention, it is also possible for the auxiliary RAN to include an MAC layer subblock, a PHY layer subblock and an RLC layer subblock, and to use a PDCP module commonly with the anchor RAN.

Figure 7:
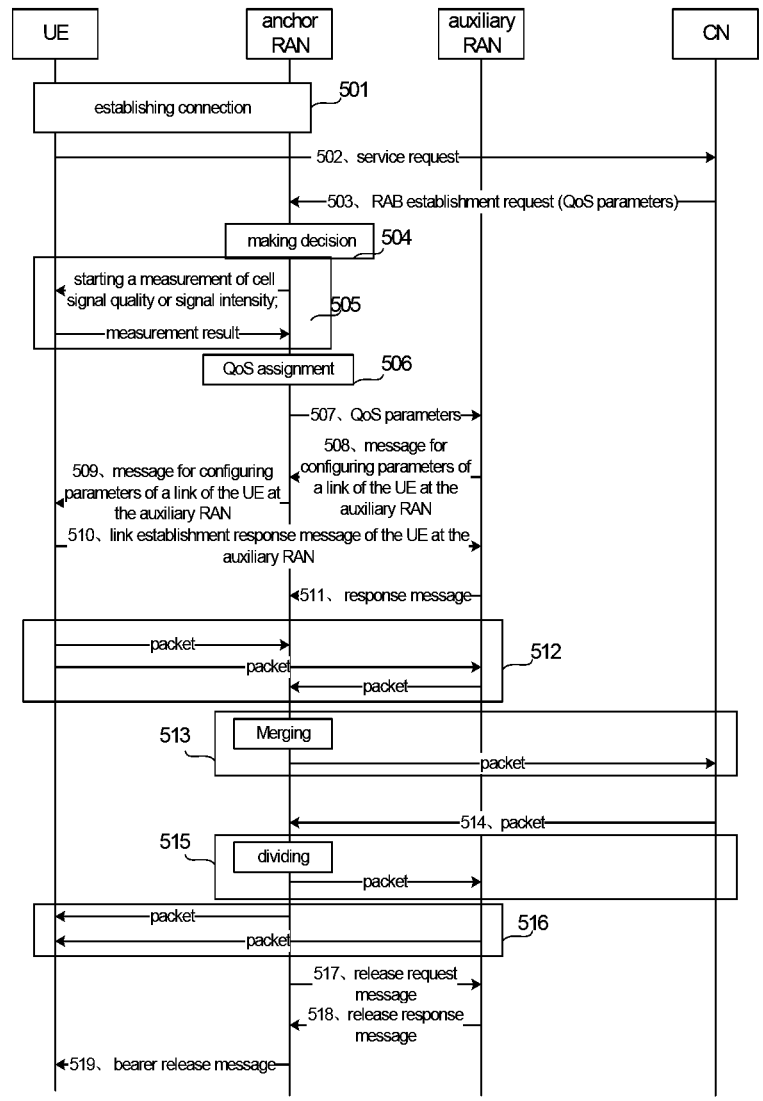
FIG. 7 is a diagram illustrating signaling interaction amongst a method for implementing a convergence system of a plurality of RANs, a method for transmitting data, and a connection releasing method according to another embodiment of the present invention.

FIG. 7 is a diagram illustrating signaling interaction amongst a method for implementing a convergence system of a plurality of RANs, a method for transmitting data, and a connection releasing method according to another embodiment of the present invention. Taken for examples in FIG. 7 are a terrestrial radio access network of the UMTS (abbreviated as "UTRAN") as an anchor RAN and a UTRAN in the LTE (EUTRAN) as an auxiliary RAN to make explanations. The method for implementing a convergence system of RANs with differing mode is recited as follows.

501—a UE establishes a connection with an anchor RAN.

For instance, the UE establishes an RRC connection with the anchor RAN. In the process of establishing the connection with the anchor RAN, the UE may report to the anchor RAN a measurement result of candidate RANs and radio access capability information of the UE in the candidate RANs. The measurement result of the candidate RANs as reported by the UE may include cell signal quality or signal intensity of the candidate RANs reported by the UE. The radio access capability information of the UE in the candidate RANs includes such radio capability information as radio frequency capability information, physical layer capability information and measurement capability information of the UE while the systems of the candidate RANs are operating. The measurement result of the candidate RANs can be carried in an RRC connection establishment request. The radio access capability information of the UE in the candidate RANs can be carried in an RRC connection establishment completion message.

502—the UE makes use of an RRC initial connection established with the anchor RAN to transmit a service request to a CN.

503—the CN transmits a radio access bearer (abbreviated as "RAB") establishment request to the anchor RAN, and transmits to the anchor RAN at least one of a QoS parameter, an encrypted parameter and an already assigned RLC layer parameter, of which the QoS parameter can be carried in the RAB establishment request.

504—the anchor RAN makes a decision: if the service should be established on a single RAN, the followings can be dispensed with; if the service should be established on at least two RANs, the process goes to the followings.

505—the anchor RAN selects an auxiliary RAN.

If in 501 the measurement result of the candidate RANs and the radio access capability information of the UE in the candidate RANs are reported to the anchor RAN during the process in which the UE establishes the connection with the anchor RAN, then in 505 the anchor RAN may select the auxiliary RAN from the candidate RANs according to the measurement result of the candidate RANs. For instance, if the cell signal quality or signal intensity of a certain candidate RAN in the measurement result of the candidate RANs reported by the UE is greater than a preset threshold value, it is possible to select this candidate RAN as the auxiliary RAN.

If in 501 the measurement result of the candidate RANs is not reported to the anchor RAN during the process in which the UE establishes the initial connection with the anchor RAN, then in 505 the anchor RAN may start a measurement of cell signal quality or signal intensity of cells of the candidate RANs (for instance, the anchor RAN may start a measurement of cells in a possibly cooperative LTE network), and obtain a measurement result. The anchor RAN may base on such factors as the measurement result and the load to determine which RAN should be selected as the auxiliary RAN. For instance, the anchor RAN may select a candidate RAN whose cell signal quality or signal intensity is greater than a preset threshold value as the auxiliary RAN, or may select a candidate RAN whose load is low as the auxiliary RAN.

In the embodiment as shown in FIG. 7, the anchor RAN selects the EUTRAN in the LTE as the auxiliary RAN.

506—the anchor RAN assigns the QoS parameters received in 503, determines the QoS parameter assigned to itself and the QoS parameter assigned to the auxiliary RAN and transmits the QoS parameter to the auxiliary RAN; alternatively, the anchor RAN may convert the QoS parameter determined to be assigned to the auxiliary RAN into a QoS parameter matching with the auxiliary RAN.

Taking for example one of the QoS parameters, namely aggregate maximum bit rate (abbreviated as "AMBR"), the anchor RAN may assign the same AMBR value to itself and to the auxiliary RAN, and the value is equivalent to the AMBR value demanded by the service (namely the AMBR value received by the anchor RAN from the core network), while it is also possible to divide the AMBR demanded by the service equally for the anchor RAN and the auxiliary RAN.

507—the anchor RAN transmits to the auxiliary RAN at least one information from such information as the QoS parameter assigned to the auxiliary RAN, the encrypted information, the radio access capability information of the UE at the auxiliary RAN, the cell information of the service, and the already assigned RLC layer parameter information. If the auxiliary RAN includes an RLC layer subblock, the anchor RAN may not transmit the RLC layer parameter information to the auxiliary RAN.

508—the auxiliary RAN transmits to the anchor RAN a message for configuring parameters of a link of the UE at the auxiliary RAN through an interface with the anchor RAN.

The message for configuring parameters of a link of the UE at the auxiliary RAN includes at least one of a physical layer parameter, an MAC parameter, an RLC layer parameter, and a PDCP layer parameter of the UE in the auxiliary RAN, and further includes signaling channel setting information. The physical layer parameter, the MAC parameter, the RLC layer parameter, and the PDCP layer parameter of the UE in the auxiliary RAN can be obtained by the auxiliary RAN according to the received QoS parameters.

509—the anchor RAN transmits to the UE the message for configuring parameters of a link of the UE at the auxiliary RAN.

Since the message for configuring parameters of a link of the UE at the auxiliary RAN includes the signaling channel setting information, after the UE has received the message for configuring parameters of a link of the UE at the auxiliary RAN, it is possible to establish a direct transfer signaling channel with the auxiliary RAN.

510—the UE transmits to the auxiliary RAN a link establishment response message of the UE at the auxiliary RAN.

Since the UE can already establish a direct transfer signaling channel with the auxiliary RAN according to the signaling channel information after 509, if the signaling channel is well established, then it is possible in 510 for the UE to directly transmit to the auxiliary RAN the link establishment response message of the UE at the auxiliary RAN, without the message having to be forwarded by the anchor RAN.

511—the auxiliary RAN transmits to the anchor RAN a response message that may include initial flow control information assigned by the auxiliary RAN. The initial flow control information may include a size of a cache assigned by the auxiliary RAN.

After 511, connections of the UE with the anchor RAN and the auxiliary RAN have already been well established, and the anchor RAN also always keeps the connection with the UE. If there is a service to be proceeded, the UE can simultaneously communicate with the two access networks of differing mode.

In this embodiment, after the connection between the auxiliary RAN and the UE has been established, the anchor RAN still keeps the connection with the UE and does not release the connection with the UE, and it is thus possible for the UE to communicate with the core network through the two access networks of differing mode. The two connections will be released until the connection between the anchor RAN and the UE and the connection between the auxiliary RAN and the UE are requested to be released.

Moreover, in this embodiment, once the anchor RAN communicates with a core network, the auxiliary RAN will not communicate with another core network, and instead communicates through the anchor RAN with the core network that is connected to the anchor RAN. The auxiliary RAN thus functions to help transmit the packet of the UE to the core network, and help transmit the packet of the core network to the UE, while there is no connection with the UE between the auxiliary RAN and the core network.

The method for transmitting data for a convergence system of RANs with differing mode based on the aforementioned establishments may comprise the following 512-513.

512—the UE transmits packets to the anchor RAN and the auxiliary RAN, and the auxiliary RAN transmits the packets to the anchor RAN.

513—the anchor RAN merges the packet of the auxiliary RAN with the packet of itself and transmits the merged packet to the CN.

It is explained in 512 and 513 how the UE simultaneously transmits packets to the CN via two RANs of differing mode.

If it is needed for the CN to transmit packets to the UE, the following 514 to 515 may be employed.

514—the CN transmits a packet to the anchor RAN.

515—the anchor RAN divides the packet transmitted from the CN according to the previously received initial flow control information, determines a size of the packet assigned to the auxiliary RAN, and transmits to the auxiliary RAN the packet determined to be transmitted by the auxiliary RAN. Specifically, the anchor RAN may determine the cache state of the auxiliary RAN according to the initial flow control information carried in the response message of the auxiliary RAN, compare the cache state of the auxiliary RAN with the cache state of itself, and determine sizes of the packets to be transmitted on the two RANs according to the cache comparison value.

516—the anchor RAN and the auxiliary RAN respectively transmit the packets to the UE.

The releasing method for a system of RANs with differing mode may employ the following 517 to 519.

517—the anchor RAN transmits a release request message to the auxiliary RAN.

518—the auxiliary RAN transmits a release response message to the anchor RAN.

519—the anchor RAN transmits to the UE a bearer release message instructing it is needed to release bearer of the auxiliary RAN.

As should be noted, in order to achieve convergence of RANs with differing mode in the embodiment illustrated by FIG. 7, it is not necessary to execute the steps sequentially to their completion, as these steps are adjustable, and can be selectively executed. For instance, if it is merely needed for the UE to transmit packets to the CN, 514 to 516 can be dispensed with. If it is not needed to release the auxiliary RAN, 517 to 519 can be dispensed with.

The aforementioned embodiment of the present invention provides a method for convergence of RANs with differing mode, whereby the anchor RAN firstly establishes a connection with the UE, and after receiving a RAB establishment request transmitted from the CN, the anchor RAN selects an auxiliary RAN and transmits QoS parameters to the auxiliary RAN, so that the auxiliary RAN establishes a connection with the UE according to the QoS parameters. Thus, convergence of RANs with differing mode is implemented, and the UE establishes connections with the anchor RAN and the auxiliary RAN at the same time, so as to improve the peak rate of the UE.

Figure 8:
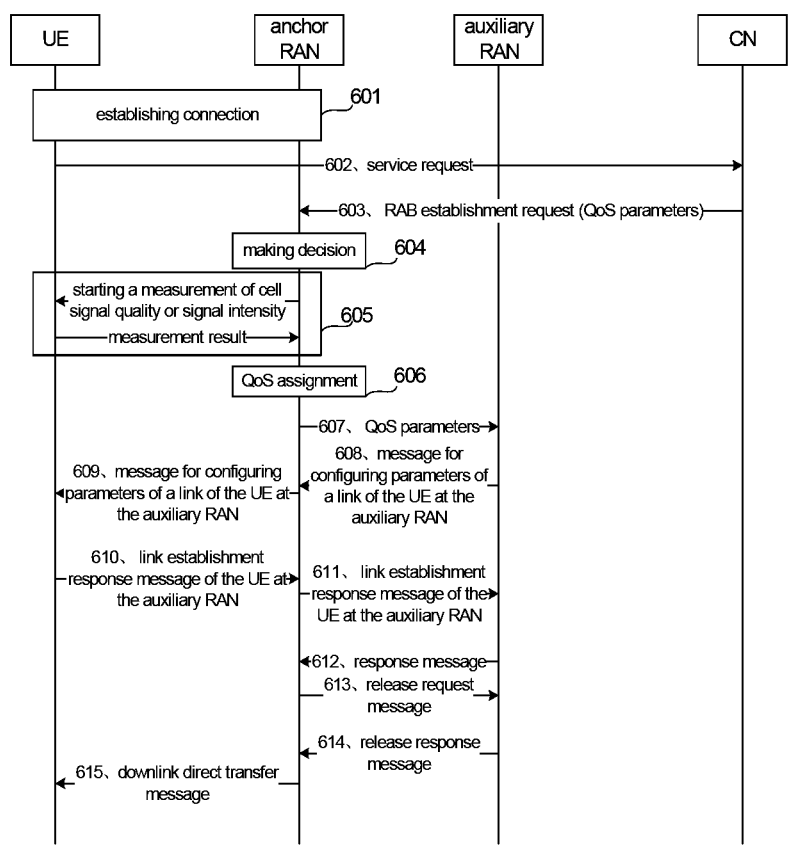
FIG. 8 is another diagram illustrating signaling interaction amongst a method for implementing a convergence system of a plurality of RANs, a method for transmitting data, and a connection releasing method according to another embodiment of the present invention.

FIG. 8 is another diagram illustrating signaling interaction amongst a method for implementing a convergence system of a plurality of RANs, a method for transmitting data, and a connection releasing method according to another embodiment of the present invention. In FIG. 8, the anchor RAN is a radio network controller (abbreviated as "RNC"), and the auxiliary RAN is a base station in the LTE (eNB). In this embodiment, the method for implementing a convergence system of RANs with differing mode includes 601-607 that are respectively identical with 501-507.

This embodiment differs from the method for implementing a convergence system of RANs with differing mode as illustrated by FIG. 7 in the fact that the method for establishing a connection between the auxiliary RAN and the UE is different from that of the embodiment illustrated by FIG. 7.

In the embodiment as shown in FIG. 8, the method for establishing a connection between the auxiliary RAN and the UE may be as described below.

608—the auxiliary RAN transmits to the anchor RAN a message for configuring parameters of a link of the UE at the auxiliary RAN via an interface with the anchor RAN. The message for configuring parameters of a link of the UE at the auxiliary RAN includes at least one of a physical layer parameter, an MAC parameter, an RLC layer parameter, and a PDCP layer parameter of the UE in the auxiliary RAN. The message for configuring parameters of a link of the UE at the auxiliary RAN can be a downlink direct transfer message.

609—the anchor RAN transmits to the UE the message for configuring parameters of a link of the UE at the auxiliary RAN.

610—the UE transmits to the anchor RAN a link establishment response message of the UE at the auxiliary RAN. Since the parameters of a link of the UE at the auxiliary RAN do not include signaling channel setting information in this embodiment, it is impossible for the UE to establish a direct transfer signaling channel with the auxiliary RAN, so the UE transmits the link establishment response message at the auxiliary RAN to the anchor RAN, and the anchor RAN forwards this message to the auxiliary RAN. The link establishment response message of the UE at the auxiliary RAN can be an uplink direct transfer message.

611—the anchor RAN transmits to the auxiliary RAN the link establishment response message of the UE at the auxiliary RAN.

612—the auxiliary RAN transmits to the anchor RAN a response message that may include initial flow control information assigned by the auxiliary RAN.

The method for releasing connection in the embodiment illustrated by FIG. 8 is also different from that illustrated by FIG. 7, specifically as follows.

613—the anchor RAN transmits a release request message to the auxiliary RAN.

614—the auxiliary RAN transmits to the anchor RAN a release response message that includes a radio resource connection release message generated by the auxiliary RAN.

615—the anchor RAN transmits to the UE the radio resource connection release message via a downlink direct transfer message (also referred to as UTI signaling direct transfer).

The releasing method for a convergence system of RANs with differing mode in this embodiment can also be applied to the system established according to the method illustrated by FIG. 7.

Figure 9:
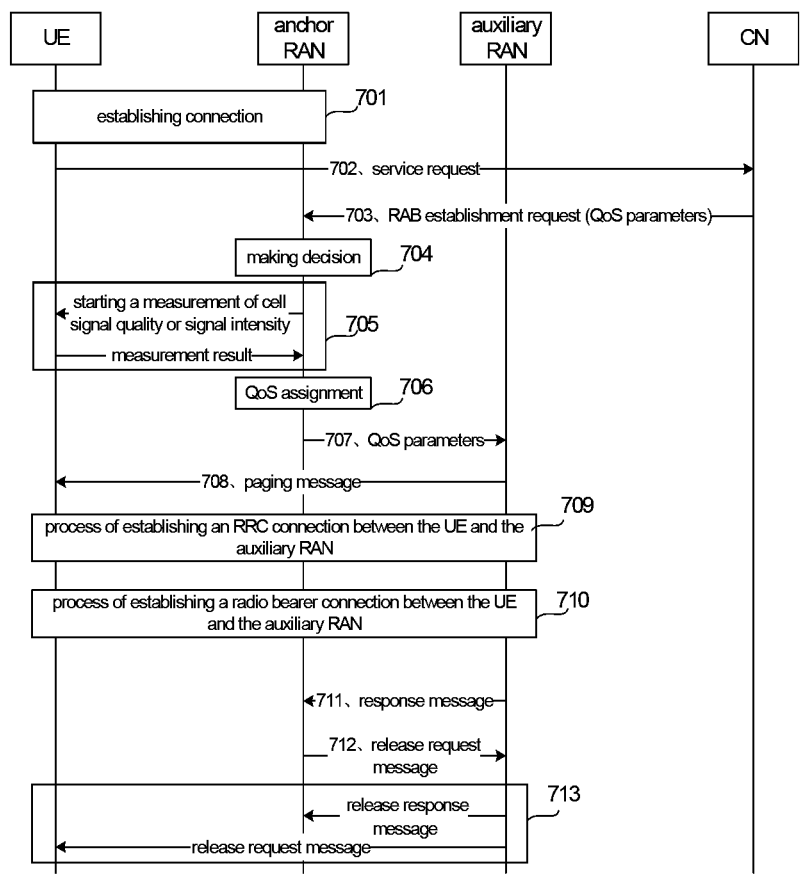
FIG. 9 is still another diagram illustrating signaling interaction amongst a method for implementing a convergence system of a plurality of RANs, a method for transmitting data, and a connection releasing method according to another embodiment of the present invention.

FIG. 9 is still another diagram illustrating signaling interaction amongst a method for implementing a convergence system of a plurality of RANs, a method for transmitting data, and a connection releasing method according to another embodiment of the present invention. In FIG. 9, the anchor RAN is an RNC, and the auxiliary RAN is an eNB in the LTE.

701-707 are respectively identical with 501-507.

The embodiment illustrated by FIG. 9 differs from the method illustrated by FIG. 7 in the fact that the method for establishing a connection between the auxiliary RAN and the UE in the embodiment illustrated by FIG. 9 is different from that of the embodiment illustrated by FIG. 7.

The method for establishing a connection between the auxiliary RAN and the UE in the embodiment illustrated by FIG. 9 may be as described below.

708—the auxiliary RAN transmits a paging message to the UE; the paging message can be directly transmitted to the UE or forwarded via the anchor RAN.

709—the UE responds to the paging message, and establishes an RRC connection with the auxiliary RAN according to QoS parameters.

710—the auxiliary RAN uses the RRC connection to establish a radio bearer connection of the auxiliary RAN with the UE.

711—the auxiliary RAN transmits to the anchor RAN a response message that includes initial flow control information assigned by the auxiliary RAN.

The method for establishing a connection between the auxiliary RAN and the UE in the embodiment illustrated by FIG. 9 is actually via the paging message to trigger the auxiliary RAN to establish a connection with the UE.

The method for releasing connection for the convergence system of RANs with differing mode established on the basis of FIG. 9 may be as described below.

712—the anchor RAN transmits a release request to the auxiliary RAN.

713—the auxiliary RAN transmits a release response to the anchor RAN, and transmits a release request message to the UE.

The releasing method for a convergence system of RANs with differing mode as illustrated by FIG. 9 can also be applied to the convergence systems of RANs with differing mode established in the embodiments illustrated by FIG. 7 and FIG. 8.

Figure 10:
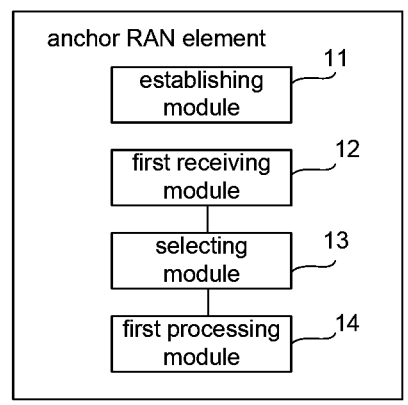
FIG. 10 is a schematic diagram exemplarily illustrating the structure of an anchor access network element according to another embodiment of the present invention.

FIG. 10 is a schematic diagram exemplarily illustrating the structure of an anchor access network element according to another embodiment of the present invention. The network element comprises an establishing module 11, a first receiving module 12, a selecting module 13 and a first processing module 14. The establishing module 11 is configured to establish a connection with the UE. The first receiving module 12 is configured to receive a RAB establishment request transmitted from the CN. The selecting module 13, connected to the first receiving module 12, is configured to selecting an auxiliary RAN after the first receiving module 12 has received the RAB establishment request transmitted from the CN. The first processing module 14, connected to the selecting module 13, configured to transmit QoS parameters to the auxiliary RAN, so that the auxiliary RAN establishes a connection with the UE according to the QoS parameters, and the connection with the UE is kept after the connection between the auxiliary RAN and the UE has been established.

In this embodiment, the selecting module 13 can be specifically configured to trigger a measurement of cells of candidate RANs, obtain a measurement result, and select an auxiliary RAN from the candidate RANs according to the measurement result. For instance, the anchor RAN may select a candidate RAN whose cell signal quality or signal intensity is greater than a preset threshold value as the auxiliary RAN.

Figure 11:
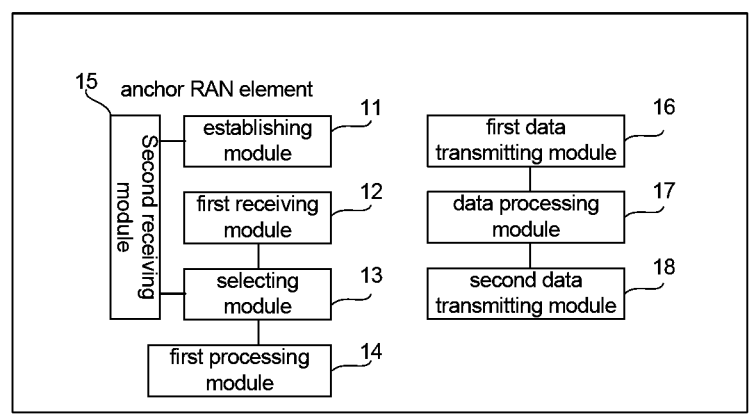
FIG. 11 is a schematic diagram exemplarily illustrating the structure of an anchor access network element according to another embodiment of the present invention.

FIG. 11 is a schematic diagram exemplarily illustrating the structure of an anchor access network element according to another embodiment of the present invention. On the basis of the network element shown in FIG. 10, the network element shown in FIG. 11 further includes a second receiving module 15 that is connected to the establishing module 11 and the selecting module 13 is configured to receive a measurement result of candidate RANs and/or radio access capability information of the candidate RANs as reported by the UE during the process in which the establishing module 11 establishes a connection with the UE. The selecting module 13 may select the auxiliary RAN according to the measurement result received by the second receiving module.

In the embodiment shown in FIG. 10 or 11, the first processing module 14 can be specifically configured to assigne QoS parameters, determining the QoS parameter assigned to the auxiliary RAN, and transmitting to the auxiliary RAN the QoS parameter determined to be assigned to the auxiliary RAN.

The embodiment as shown in FIG. 11 may further include a first data transmitting module 16, a data processing module 17 and a second data transmitting module 18. The first data transmitting module 16 is configured to receive a packet transmitted from the UE and a packet transmitted from the auxiliary RAN after the packet having been transmitted by the UE to the auxiliary RAN. The data processing module 17 is connected to the first data transmitting module 16 and is configured to merge the packet transmitted from the UE and the packet transmitted from the auxiliary RAN after the packet having been transmitted by the UE to the auxiliary RAN as received by the first data transmitting module 16. The second data transmitting module 18 is connected to the data processing module 17 and is configured to transmit the packet merged by the data processing module 17 to the CN.

The second data transmitting module 18 can also be configured to receive a packet transmitted from the CN. The data processing module 17 can also be configured to determine a size of a packet assigned to the auxiliary RAN, divide the received packet, and transmit to the first data transmitting module 16 the packet determined to be assigned to the auxiliary RAN. The first data transmitting module 16 can also be configured to transmit to the auxiliary RAN the packet determined by the data processing module 17 to be assigned to the auxiliary RAN, and transmit to the UE the packet determined to be assigned to itself.

See the foregoing descriptions of the method embodiments for the working principles of the various modules in the embodiments shown in FIG. 10 and FIG. 11.

Figure 12:
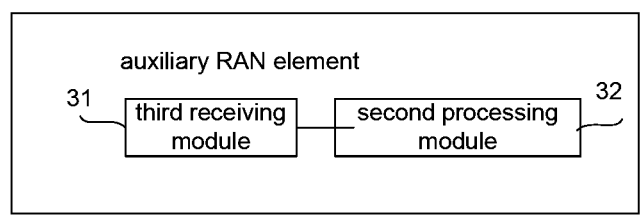
FIG. 12 is a schematic diagram exemplarily illustrating the structure of an auxiliary RAN element according to another embodiment of the present invention.

FIG. 12 is a schematic diagram exemplarily illustrating the structure of an auxiliary RAN element according to another embodiment of the present invention. The network element includes a third receiving module 31 and a second processing module 32. The third receiving module 31 is configured to receive QoS parameters transmitted from an anchor RAN that has already established a connection with a UE. The second processing module 32 is connected to the third receiving module 31 and is configured to establish a connection with the UE according to the QoS parameters.

Figure 13:
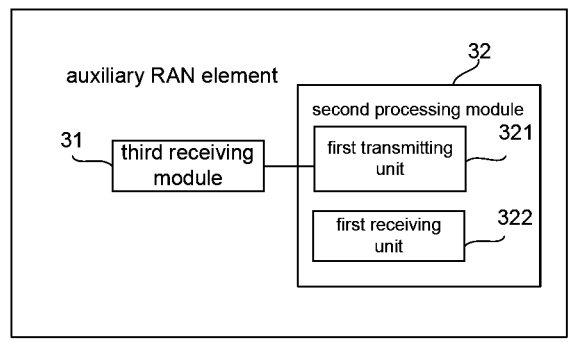
FIG. 13 is a schematic diagram exemplarily illustrating the structure of an auxiliary RAN element according to another embodiment of the present invention.

FIG. 13 is a schematic diagram exemplarily illustrating the structure of an auxiliary RAN element according to another embodiment of the present invention. In this embodiment, the second processing module 32 includes a first transmitting unit 321 and a first receiving unit 322. The first transmitting unit 321 is configured to transmit to the anchor RAN a message for configuring parameters of a link of the UE at the auxiliary RAN, so that the anchor RAN transmits to the UE the message for configuring parameters of a link of the UE at the auxiliary RAN. The message for configuring parameters of a link of the UE at the auxiliary RAN includes at least one of a physical layer parameter, an MAC parameter, an RLC layer parameter, and a PDCP layer parameter of the UE in the auxiliary RAN. The first receiving unit 322 is configured to receive a link establishment response message of the UE at the auxiliary RAN as transmitted by the anchor RAN, and the link establishment response message of the UE at the auxiliary RAN as transmitted by the anchor RAN is transmitted by the UE to the anchor RAN.

Figure 14:
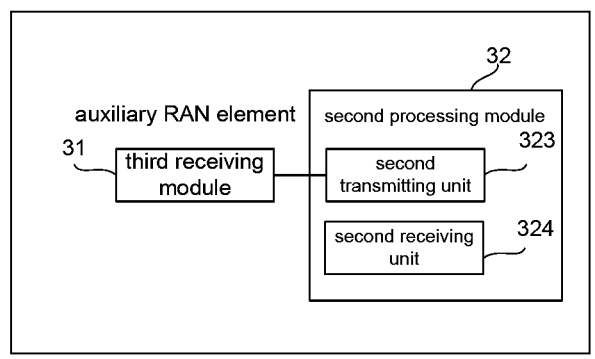
FIG. 14 is a schematic diagram exemplarily illustrating the structure of an auxiliary RAN element according to another embodiment of the present invention.

FIG. 14 is a schematic diagram exemplarily illustrating the structure of an auxiliary RAN element according to another embodiment of the present invention. In FIG. 14, the third processing module includes a second transmitting unit 323 and a second receiving unit 324. The second transmitting unit 323 is configured to transmit to the anchor RAN a message for configuring parameters of a link of the UE at the auxiliary RAN, so that the anchor RAN transmits to the UE the message for configuring parameters of a link of the UE at the auxiliary RAN. In this embodiment, the message for configuring parameters of a link of the UE at the auxiliary RAN includes at least one of a physical layer parameter, an MAC parameter, an RLC layer parameter, and a PDCP layer parameter of the UE in the auxiliary RAN, and further includes signaling channel setting information. The second receiving unit 324 is configured to receive a link establishment response message of the UE at the auxiliary RAN as transmitted by the UE.

Figure 15:
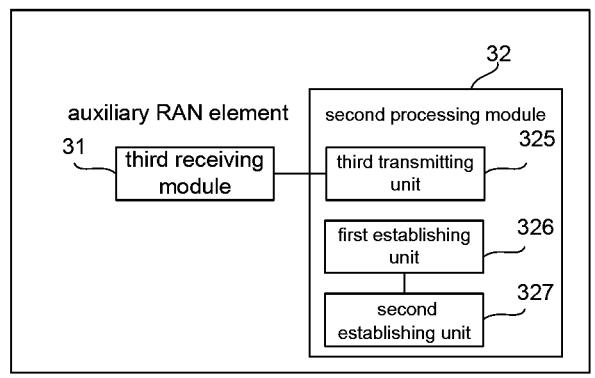
FIG. 15 is a schematic diagram exemplarily illustrating the structure of an auxiliary RAN element according to another embodiment of the present invention.

FIG. 15 is a schematic diagram exemplarily illustrating the structure of an auxiliary RAN element according to another embodiment of the present invention. In FIG. 15, the third processing module includes a third transmitting unit 325, a first establishing unit 326 and a second establishing unit 327. The third transmitting unit 325 is configured to transmit a paging message to the UE. The first establishing unit 326 is configured to establish an RRC connection with the UE. The second establishing unit 327 is connected to the first establishing unit 326 and is configured to establish a radio bearer connection with the UE after the first establishing unit 326 has established the RRC connection with the UE.

See the foregoing descriptions of the method embodiments for the working principles of the various modules of the auxiliary RAN elements as shown in FIGS. 12-15.

An embodiment of the present invention further provides a convergence system of a plurality of RANs, which system can include the anchor RAN element and the auxiliary RAN element as described in the foregoing embodiments. The anchor RAN element and the auxiliary RAN element can both communicate with the UE. In comparison with the prior art, this system can improve the peak rate of the UE.

As comprehensible to persons ordinarily skilled in the art, the entire or partial steps of the aforementioned method embodiments can be realized by a program that instructs relevant hardware, and the program can be stored in a computer-readable storage medium and execute the steps of the aforementioned method embodiments when executed. The storage medium includes such various media capable of storing program codes as an ROM, an RAM, a magnetic disc or an optical disc, and so on.

As should be finally explained, the aforementioned embodiments are merely employed to describe, rather than to restrict, the technical solutions of the present invention. Although the present invention is described in detail above with reference to the aforementioned embodiments, it should be made aware to persons ordinarily skilled in the art that it is still possible to modify the technical solutions recorded in the aforementioned embodiments or to equivalently replace partial technical features therein, and that such modifications or replacements do not depart the corresponding technical solutions essentially from the spirits and scopes of the technical solutions of the various embodiments according to the present invention.

What is claimed is:

1. A method for implementing a convergence system of a plurality of radio access networks, the method comprising:

establishing, by an anchor radio access network, a first connection with a user equipment;

receiving, by the anchor radio access network, a radio access bearer establishment request transmitted from a core network;

selecting, by the anchor radio access network, an auxiliary radio access network;

sending, by the anchor radio access network, quality of service parameters to the auxiliary radio access network, so that the auxiliary radio access network establishes a second connection with the user equipment based on the quality of service parameters, while the anchor radio access network keeps the first connection with the user equipment;

transmitting, by the anchor radio access network, to the auxiliary radio access network a packet assigned to the auxiliary radio access network, so that the auxiliary radio access network transmits the packet assigned to the auxiliary radio access network to the user equipment; and transmitting, by the anchor radio access network, to the user equipment a packet that is determined to be assigned to the anchor radio access network, wherein the packet assigned to the auxiliary radio access network and the packet that is determined to be assigned to the anchor radio access network are obtained by dividing, by the anchor radio access network, one or more packets received from the core network; and wherein the sending, by the anchor radio access network, the quality of service parameters to the auxiliary radio access network is followed by:

receiving, by the anchor radio access network, a message for configuring parameters of a link of the user equipment at the auxiliary radio access network transmitted from the auxiliary radio access network; and sending, by the anchor radio access network, the message for configuring parameters of the link of the user equipment at the auxiliary radio access network to the user equipment, wherein the message for configuring parameters of the link of the user equipment at the auxiliary radio access network comprises at least one of a physical layer parameter, a media access control parameter, a radio link control layer parameter, and a packet data convergence protocol layer parameter of the user equipment in the auxiliary radio access network; and wherein the physical layer parameter, the media access control parameter, the radio link control layer parameter, and the packet data convergence protocol layer parameter in the auxiliary radio access network are obtained by the auxiliary radio access network according to the quality of service parameters.

2. The method according to claim 1, further comprising:

receiving, by the anchor radio access network, a measurement result of candidate radio access networks and/or radio access capability information of the candidate radio access networks reported by the user equipment.

3. The method according to claim 2, wherein the receiving, by the anchor radio access network, the measurement result of the candidate radio access networks reported by the user equipment comprises:

receiving, by the anchor radio access network, a radio connection establishment request transmitted from the user equipment, wherein the radio connection establishment request comprises the measurement result of the candidate radio access networks.

4. The method according to claim 3, wherein the selecting, by the anchor radio access network, the auxiliary radio access network comprises:
   selecting, by the anchor radio access network, the auxiliary radio access network according to the received measurement result of the candidate radio access networks.

5. The method according to claim 1, wherein the selecting, by the anchor radio access network, the auxiliary radio access network comprises:
   triggering, by the anchor radio access network, a measurement of cell signal quality or signal intensity of cells of candidate radio access networks;
   obtaining, by the anchor radio access network, a measurement result; and
   selecting, by the anchor radio access network, the auxiliary radio access network from the candidate radio access networks according to the measurement result.

6. The method according to claim 1, wherein the radio access bearer establishment request comprises the quality of service parameters; and the sending, by the anchor radio access network, the quality of service parameters to the auxiliary radio access network comprises:
   determining, by the anchor radio access network, a first quality of service parameter assigned to the auxiliary radio access network;
   determining, by the anchor radio access network, a second quality of service parameter assigned to the anchor radio access network; and
   transmitting, by the anchor radio access network, to the auxiliary radio access network the first quality of service parameter assigned to the auxiliary radio access network,
   wherein, the first quality of service parameter assigned to the auxiliary radio access network and the second quality of service parameter assigned to the anchor radio access network are assigned from the quality of service parameters received from the core network.

7. The method according to claim 6, wherein the transmitting, by the anchor radio access network, to the auxiliary radio access network the first quality of service parameter assigned to the auxiliary radio access network comprises:
   converting, by the anchor radio access network, the first quality of service parameter assigned to the auxiliary radio access network into a third quality of service parameter matching with the auxiliary radio access network; and
   transmitting, by the anchor radio access network, the second third quality of service parameter to the auxiliary radio access network.

8. The method according to claim 1, further comprising:
   transmitting, by the anchor radio access network, to the auxiliary radio access network at least one of encrypted information, cell information having an established a service, radio access capability information of the user equipment in the auxiliary radio access network, and an already assigned radio connection control parameter.

9. The method according to claim 1, further comprising:
   receiving, by the anchor radio access network, a packet transmitted from the user equipment;
   merging, by the anchor radio access network, the packet transmitted from the user equipment and a packet transmitted from the auxiliary access radio network, wherein the packet transmitted from the auxiliary access radio network is transmitted by the user equipment to the auxiliary radio access network; and
   transmitting, by the anchor radio access network, merged packets to the core network.

10. The method according to claim 1, further comprising:
    transmitting, by the anchor radio access network, a release request message to the auxiliary radio access network;
    receiving, by the anchor radio access network, a release response message transmitted from the auxiliary radio access network; and
    transmitting, by the anchor radio access network, a bearer release message to the user equipment in order to instruct the user equipment to release a bearer of the auxiliary radio access network.

11. The method according to claim 1, further comprising:
    transmitting, by the anchor radio access network, a release request message to the auxiliary radio access network;
    receiving, by the anchor radio access network, a release response message transmitted from the auxiliary radio access network, wherein the release response message comprises a radio resource connection release message generated by the auxiliary radio access network; and
    transmitting, by the anchor radio access network, the radio resource connection release message to the user equipment via a direct transfer signaling.

12. A method for implementing a convergence system of a plurality of radio access networks, comprising:
    receiving, by an auxiliary radio access network, quality of service parameters transmitted from an anchor radio access network that has already established a first connection with a user equipment;
    establishing, by the auxiliary radio access network, a second connection with the user equipment according to the quality of service parameters;
    receiving, by the auxiliary radio access network, a packet assigned to the auxiliary radio access network by the anchor radio access network from the anchor radio access network; and
    transmitting, by the auxiliary radio access network, the packet assigned to the auxiliary radio access network to the user equipment,
    wherein the packet assigned to the auxiliary radio access network by the anchor radio access network and a packet that is determined to be assigned to the anchor radio access network and transmitted to the user equipment by the anchor radio access network are divided from one or more packets received from a core network by the anchor radio access network; and
    wherein the establishing, by the auxiliary radio access network, the second connection with the user equipment according to the quality of service parameters comprises:
       transmitting, by the auxiliary radio access network to the anchor radio access network, a message for configuring parameters of a link of the user equipment at the auxiliary radio access network, so that the anchor radio access network transmits to the user equipment the message for configuring parameters of the link of the user equipment at the auxiliary radio access network;
       wherein the message for configuring parameters of the link of the user equipment at the auxiliary radio access network comprises at least one of a physical layer parameter, a media access control parameter, a radio link control layer parameter, and a packet data convergence protocol layer parameter of the user equipment in the auxiliary radio access network; and
       wherein the physical layer parameter, the media access control parameter, the radio link control layer parameter, and the packet data convergence protocol layer parameter in the auxiliary radio access network are obtained by the auxiliary radio access network according to the quality of service parameters.

13. The method according to claim 12, wherein the establishing, by the auxiliary radio access network, the second connection with the user equipment according to the quality of service parameters further comprises:
receiving, by the auxiliary radio access network, a link establishment response message of the user equipment at the auxiliary radio access network, transmitted from the anchor radio access network, wherein the link establishment response message of the user equipment at the auxiliary radio access network as transmitted from the anchor radio access network is transmitted by the user equipment to the anchor radio access network.

14. The method according to claim 13, wherein the message for configuring parameters of the link of the user equipment at the auxiliary radio access network is a downlink direct transfer message, and the link establishment response message of the user equipment at the auxiliary radio access network is an uplink direct transfer message.

15. The method according to claim 13, further comprising:
transmitting, by the auxiliary radio access network, a response message to the anchor radio access network, wherein the response message comprises initial flow control information.

16. The method according to claim 12, further comprising:
receiving, by the auxiliary radio access network, a release request message transmitted from the anchor radio access network; and
transmitting, by the auxiliary radio access network, a release response message to the anchor radio access network, and;
transmitting, by the auxiliary radio access network, the release request message to the user equipment.

17. An anchor radio access network element, comprising:
a transmitter, configured to receive a radio access bearer establishment request transmitted from a core network; and
a processor, configured to establish a first connection with a user equipment and to select an auxiliary radio access network element;
wherein the transmitter is further configured to transmit quality of service parameters to the auxiliary radio access network element, so that the auxiliary radio access network element establishes a second connection with the user equipment according to the quality of service parameters,
wherein the anchor radio access network element keeps the first connection with the user equipment after the auxiliary radio access network element establishes the second connection with the user equipment,
wherein the transmitter is further configured to transmit a packet assigned to the auxiliary radio access network element to the auxiliary radio access network element, so that the auxiliary radio access network element transmits the packet assigned to the auxiliary radio access network element to the user equipment;
wherein the transmitter is further configured to transmit to the user equipment a packet that is determined to be assigned to the anchor radio access network element;
wherein the packet assigned to the auxiliary radio access network element and the packet that is determined to be assigned to the anchor radio access network element are obtained by dividing, by the anchor radio access network element, one or more packets received from the core network; and
wherein the transmitter is further configured to transmit the quality of service parameters to the auxiliary radio access network element by receiving a message for configuring parameters of a link of the user equipment at the auxiliary radio access network element transmitted from the auxiliary radio access network element, and sending the message for configuring parameters of the link of the user equipment at the auxiliary radio access network element to the user equipment,
wherein the message for configuring parameters of the link of the user equipment at the auxiliary radio access network element comprises at least one of a physical layer parameter, a media access control parameter, a radio link control layer parameter, and a packet data convergence protocol layer parameter of the user equipment in the auxiliary radio access network element, and
wherein the physical layer parameter, the media access control parameter, the radio link control layer parameter, and the packet data convergence protocol layer parameter in the auxiliary radio access network element are obtained by the auxiliary radio access network element according to the quality of service parameters.

18. The anchor radio access network element according to claim 17, wherein
The transmitter is further configured to receive, in a process during which the processor establishes the first connection with the user equipment, a measurement result of candidate radio access network elements and/or radio access capability information of the candidate radio access network elements reported by the user equipment.

19. The anchor radio access network element according to claim 18, wherein
the processor is configured to select the auxiliary radio access network element according to the measurement result of the candidate radio access network elements received by the transmitter, wherein the measurement result of the candidate radio access network elements is reported by the user equipment to the transmitter.

20. The anchor radio access network element according to claim 17, wherein
the processor is configured to trigger a measurement of cells of candidate radio access network elements, obtain a measurement result, and select the auxiliary radio access network element from the candidate radio access network elements according to the measurement result.

21. The anchor radio access network element according to claim 17, wherein
the processor is configured to determine a first quality of service parameter assigned to the auxiliary radio access network element and a second quality of service parameter assigned to the anchor radio access network element, and transmit to the auxiliary radio access network element the first quality of service parameter assigned to the auxiliary radio access network element,
wherein, the first quality of service parameter assigned to the auxiliary radio access network element and the second quality of service parameter assigned to the anchor radio access network element are assigned from the quality of service parameters received from the core network.

22. The anchor radio access network element according to claim 17, wherein the transmitter is further configured to receive a first packet transmitted from the user equipment and a packet transmitted from the auxiliary access radio network element after the packet transmitted from the auxiliary access radio network element is transmitted by the user equipment to the auxiliary radio access network element;

the processor is further configured to merge the packet transmitted from the user equipment as received by the transmitter and the packet transmitted from the auxiliary access radio network element after the packet transmitted from the auxiliary access radio network element is transmitted by the user equipment to the auxiliary radio access network element; and the transmitter is further configured to transmit merged packets from the processor to the core network.

23. The anchor radio access network element according to claim 22, wherein the transmitter is further configured to receive the one or more packets transmitted from the core network; and the processor is further configured to, after the transmitter receives the one or more packets transmitted from the core network, determine a size of the packet assigned to the auxiliary radio access network element and a size of the packet that is determined to be assigned to the anchor radio access network, divide the one or more packets received from the core network by the transmitter, and transmit to the transmitter the packet assigned to the auxiliary radio access network element.

24. An auxiliary radio access network element, comprising:

a transmitter, configured to receive quality of service parameters transmitted from an anchor radio access network element that has already established a first connection with a user equipment; and a processor, configured to establish a second connection with the user equipment according to the quality of service parameters;

wherein the transmitter is further configured to receive a packet assigned to the auxiliary radio access network element by the anchor radio access network element from the anchor radio access network element, and transmit the packet assigned to the auxiliary radio access network element to the user equipment;

wherein the packet assigned to the auxiliary radio access network element by the anchor radio access network element and a packet that is determined to be assigned to the anchor radio access network and transmitted to the user equipment by the anchor radio access network element are divided from one or more packets received from a core network by the anchor radio access network element; and wherein the transmitter is further configured to transmit to the anchor radio access network element a message for configuring parameters of a link of the user equipment at the auxiliary radio access network element, so that the anchor radio access network element transmits to the user equipment the message for configuring parameters of the link of the user equipment at the auxiliary radio access network element, wherein the message for configuring parameters of the link of the user equipment at the auxiliary radio access network element comprises at least one of a physical layer parameter, a media access control parameter, a radio link control layer parameter, and a packet data convergence protocol layer parameter of the user equipment in the auxiliary radio access network element, and wherein the physical layer parameter, the media access control parameter, the radio link control layer parameter, and the packet data convergence protocol layer parameter in the auxiliary radio access network element are obtained by the auxiliary radio access network element according to the quality of service parameters.

25. The auxiliary radio access network element according to claim 24, wherein the transmitter is further configured to receive a link establishment response message of the user equipment at the auxiliary radio access network element, transmitted from the anchor radio access network element, wherein the link establishment response message of the user equipment at the auxiliary radio access network element as transmitted from the anchor radio access network element is transmitted by the user equipment to the anchor radio access network element.

26. The method according to claim 9, wherein:

the packet transmitted from the user equipment is received through following layers of the anchor radio access network comprising a packet data convergence protocol layer, a radio link control layer, a media access control layer and a physical layer;

the packet transmitted from the auxiliary access radio network is received through following layers of the auxiliary radio access network comprising a packet data convergence protocol layer, a radio link control layer, a media access control layer and a physical layer.

27. The method according to claim 1, wherein:

the packet that is determined to be assigned to the anchor radio access network is transmitted through following layers of the anchor radio access network comprising a packet data convergence protocol layer, a radio link control layer, a media access control layer and a physical layer, wherein the packet data convergence protocol layer is commonly used by the anchor radio access network and the auxiliary radio access network; and/or the packet assigned to the auxiliary radio access network is transmitted through following layers of the auxiliary radio access network comprising a radio link control layer, a media access control layer, a physical layer and the packet data convergence protocol layer that is commonly used with the anchor radio access network.

28. The method according to claim 12, wherein the message for configuring parameters of the link of the user equipment at the auxiliary radio access network further comprises signaling channel setting information.

29. The method according to claim 28, wherein the establishing, by the auxiliary radio access network, the connection with the user equipment according to the quality of service parameters comprises:

receiving, by the auxiliary radio access network, a link establishment response message of the user equipment at the auxiliary radio access network transmitted from the user equipment.

30. The method according to claim 12, further comprising:

receiving, by the auxiliary radio access network, a packet transmitted from the user equipment; and transmitting, by the auxiliary radio access network, the packet transmitted from the user equipment to the anchor radio access network.

31. The method according to claim 30, wherein the packet transmitted from the user equipment and received by the anchor radio access network is received and/or transmitted through following layers comprising a packet data convergence protocol layer, a radio link control layer, a media access control layer and a physical layer, wherein the packet data convergence protocol layer is commonly used by the anchor radio access network and the auxiliary radio access network.

32. The method according to claim 12, wherein
the packet assigned to the auxiliary radio access network is received and/or transmitted through following layers comprising a packet data convergence protocol layer, a radio link control layer, a media access control layer and a physical layer, wherein the packet data convergence protocol layer is commonly used by the anchor radio access network and the auxiliary radio access network.

33. The method according to claim 12, wherein the auxiliary radio access network employs an accessing technique different from that employed by the anchor radio access network or identical with that employed by the anchor radio access network.

34. The auxiliary radio access network element according to claim 24, wherein the message for configuring parameters of the link of the user equipment at the auxiliary radio access network element further comprises signaling channel setting information.

35. The auxiliary radio access network element according to claim 34, wherein the transmitter is further configured to receive a link establishment response message of the user equipment at the auxiliary radio access network element transmitted from the user equipment.

36. A method for implementing a convergence system of a plurality of radio access networks, comprising:
    establishing, by a user equipment, a first connection with an anchor radio access network;
    establishing, by the user equipment, a second connection with an auxiliary radio access network based on quality of service parameters, while the user equipment keeps the first connection with the anchor radio access network;
    receiving, by the user equipment, a packet assigned to the auxiliary radio access network by the anchor radio access network from the auxiliary radio access network; and
    receiving, by the user equipment, a packet that is determined to be assigned to the anchor radio access network from the anchor radio access network,
    wherein the packet assigned to the auxiliary radio access network and the packet that is determined to be assigned to the anchor radio access network are divided from one or more packets that are received from a core network by the anchor radio access network,
    wherein the auxiliary radio access network is selected by the anchor radio access network,
    wherein the quality of service parameters are transmitted from the anchor radio access network to the auxiliary radio access network, and
    wherein the establishing, by the user equipment, a second connection with an auxiliary radio access network based on quality of service parameters comprises:
    receiving, by the user equipment, a message for configuring parameters of a link of the user equipment at the auxiliary radio access network transmitted from the anchor radio access network, wherein the message for configuring parameters of a link of the user equipment at the auxiliary radio access network are obtained by the auxiliary radio access network according to the quality of service parameters and sent to the anchor radio network.

37. The method according to claim 36, further comprising:
    reporting, by the user equipment, a measurement result of candidate radio access networks and/or radio access capability information of the candidate radio access networks to the anchor radio access network, wherein the anchor radio access network selects the auxiliary radio access network according to the measurement result of the candidate radio access networks.

38. The method according to claim 37, wherein the reporting, by the user equipment, a measurement result of candidate radio access networks to the anchor radio access network comprises:
    sending, by the user equipment, a radio connection establishment request to the anchor radio access network, wherein the radio connection establishment request comprises the measurement result of the candidate radio access networks.

39. The method according to claim 36, further comprising:
    transmitting, by the user equipment, a link establishment response message of the user equipment at the auxiliary radio access network to the anchor radio access network, or
    transmitting, by the user equipment, a link establishment response message of the user equipment at the auxiliary radio access network to the auxiliary radio access network.

40. The method according to claim 36, wherein before establishing, by the user equipment, the second connection with an auxiliary radio access network based on quality of service parameters, the method further comprising:
    transmitting, by the user equipment, a service request to a core network by making use of an radio resource control initial connection established with the anchor radio access network.

41. The method according to claim 36, further comprising:
    transmitting, by the user equipment, a first packet to the anchor radio access network; and
    transmitting, by the user equipment, a packet to the auxiliary radio access network, so that the auxiliary radio access network transmits the packet transmitted from the user equipment to the auxiliary radio access network to the anchor radio access network.

42. The method according to claim 41, wherein:
    the packet transmitted from the user equipment to the anchor radio access network is transmitted through following layers of the anchor radio access network comprising a packet data convergence protocol layer, a radio link control layer, a media access control layer and a physical layer;
    the packet transmitted from the user equipment to the auxiliary radio access network is transmitted through following layers of the auxiliary radio access network comprising a packet data convergence protocol layer, a radio link control layer, a media access control layer and a physical layer.

43. The method according to claim 41, wherein:
    the packet transmitted from the user equipment to the anchor radio access network is transmitted through following layers comprising a packet data convergence protocol layer, a radio link control layer, a media access control layer and a physical layer, wherein the packet data convergence protocol layer is commonly used by the anchor radio access network and the auxiliary radio access network, the radio link control layer, the media access control layer and the physical layer are from the anchor radio access network, or, the packet data convergence protocol layer and the radio link control layer are commonly used by the anchor radio access network and the auxiliary radio access network, the media access control layer and the physical layer are from the anchor radio access network;

the packet transmitted from the user equipment to the auxiliary radio access network is transmitted through following layers comprising a packet data convergence protocol layer, a radio link control layer, a media access control layer and a physical layer, wherein the packet data convergence protocol layer is commonly used by the anchor radio access network and the auxiliary radio access network, the radio link control layer, the media access control layer and the physical layer are from the auxiliary radio access network, or, the packet data convergence protocol layer and the radio link control layer are commonly used by the anchor radio access network and the auxiliary radio access network, the media access control layer and the physical layer are from the auxiliary radio access network.

44. The method according to claim 36, wherein:

the packet that is determined to be assigned to the anchor radio access network is transmitted through following layers of the anchor radio access network comprising a packet data convergence protocol layer, a radio link control layer, a media access control layer and a physical layer;

the packet assigned to the auxiliary radio access network is transmitted through following layers of the auxiliary radio access network comprising a packet data convergence protocol layer, a radio link control layer, a media access control layer and a physical layer.

45. The method according to claim 36, wherein:

the packet that is determined to be assigned to the anchor radio access network is transmitted through following layers comprising a packet data convergence protocol layer, a radio link control layer, a media access control layer and a physical layer, wherein the packet data convergence protocol layer is commonly used by the anchor radio access network and the auxiliary radio access network, the radio link control layer, the media access control layer and the physical layer are from the anchor radio access network, or, the packet data convergence protocol layer and the radio link control layer are commonly used by the anchor radio access network and the auxiliary radio access network, the media access control layer and the physical layer are from the anchor radio access network;

the packet assigned to the auxiliary radio access network is transmitted through following layers comprising a packet data convergence protocol layer, a radio link control layer, a media access control layer and a physical layer, wherein the packet data convergence protocol layer is commonly used by the anchor radio access network and the auxiliary radio access network, the radio link control layer, the media access control layer and the physical layer are from the auxiliary radio access network, or, the packet data convergence protocol layer and the radio link control layer are commonly used by the anchor radio access network and the auxiliary radio access network, the media access control layer and the physical layer are from the auxiliary radio access network.

46. The method according to claim 43, wherein the packet data convergence protocol layer commonly used by the anchor radio access network and the auxiliary radio access network is set in the anchor radio access network.

47. A user equipment, comprising:

a processor, configured to:
 establish a first connection with an anchor radio access network element; and
 establish a second connection with an auxiliary radio access network element based on quality of service parameters, while the user equipment keeps the first connection with the anchor radio access network element;

a receiver, configured to:
 receive a packet assigned to the auxiliary radio access network element by the anchor radio access network element from the auxiliary radio access network element; and
 receive a packet that is determined to be assigned to the anchor radio access network element from the anchor radio access network element,
 wherein the packet assigned to the auxiliary radio access network element and the packet that is determined to be assigned to the anchor radio access network element are divided from one or more packets that are received from a core network by the anchor radio access network element;

wherein the auxiliary radio access network element is selected by the anchor radio access network element, wherein the quality of service parameters are transmitted from the anchor radio access network element to the auxiliary radio access network element, and wherein the processor is configured to establish a second connection with an auxiliary radio access network element based on quality of service parameters by receiving a message for configuring parameters of a link of the user equipment at the auxiliary radio access network transmitted from the anchor radio access network, wherein the message for configuring parameters of a link of the user equipment at the auxiliary radio access network are obtained by the auxiliary radio access network according to the quality of service parameters and sent to the anchor radio network.

48. The user equipment according to claim 47, wherein the processor is further configured to report a measurement result of candidate radio access network elements and/or radio access capability information of the candidate radio access network elements to the anchor radio access network element, wherein the anchor radio access network element selects the auxiliary radio access network element according to the measurement result of the candidate radio access network elements.

49. The user equipment according to claim 48, wherein the processor is further configured to report the measurement result of candidate radio access network elements to the anchor radio access network element by sending a radio connection establishment request to the anchor radio access network, wherein the radio connection establishment request comprises the measurement result of the candidate radio access networks.

50. The user equipment according to claim 47, wherein the user equipment further comprises a transmitter that is configured to transmit a link establishment response message of the user equipment at the auxiliary radio access network element to the anchor radio access network element or the auxiliary radio access network element.

51. The user equipment according to claim 47, wherein the user equipment further comprises a transmitter that is configured to transmit a service request to a core network by making use of an radio resource control initial connection established with the anchor radio access network element.

52. The user equipment according to claim 47, wherein the user equipment further comprises a transmitter that is configured to transmit a packet to the anchor radio access network element and a packet to the auxiliary radio access network element, so that the auxiliary radio access network element transmits the packet received at the auxiliary radio access network element from the transmitter to the anchor radio access network element.

53. The user equipment according to claim 52, wherein:
the packet transmitted to the anchor radio access network element from the transmitter is transmitted through following layers of the anchor radio access network element comprising a packet data convergence protocol layer, a radio link control layer, a media access control layer and a physical layer;
the packet transmitted to the auxiliary radio access network element from the transmitter is transmitted through following layers of the auxiliary radio access network element comprising a packet data convergence protocol layer, a radio link control layer, a media access control layer and a physical layer.

54. The user equipment according to claim 52, wherein:
the packet transmitted to the anchor radio access network element from the transmitter is transmitted through following layers comprising a packet data convergence protocol layer, a radio link control layer, a media access control layer and a physical layer, wherein the packet data convergence protocol layer is commonly used by the anchor radio access network element and the auxiliary radio access network element, the radio link control layer, the media access control layer and the physical layer are from the anchor radio access network element, or, the packet data convergence protocol layer and the radio link control layer are commonly used by the anchor radio access network element and the auxiliary radio access network element, the media access control layer and the physical layer are from the anchor radio access network element;
the packet transmitted to the auxiliary radio access network element from the transmitter is transmitted through following layers comprising a packet data convergence protocol layer, a radio link control layer, a media access control layer and a physical layer, wherein the packet data convergence protocol layer is commonly used by the anchor radio access network element and the auxiliary radio access network element, the radio link control layer, the media access control layer and the physical layer are from the auxiliary radio access network element, or, the packet data convergence protocol layer and the radio link control layer are commonly used by the anchor radio access network element and the auxiliary radio access network element, the media access control layer and the physical layer are from the auxiliary radio access network element.

55. The user equipment according to claim 47, wherein:
the packet that is determined to be assigned to the anchor radio access network element is transmitted through following layers of the anchor radio access network element comprising a packet data convergence protocol layer, a radio link control layer, a media access control layer and a physical layer;
the packet assigned to the auxiliary radio access network element is transmitted through following layers of the auxiliary radio access network element comprising a packet data convergence protocol layer, a radio link control layer, a media access control layer and a physical layer.

56. The user equipment according to claim 47, wherein:
the packet that is determined to be assigned to the anchor radio access network element is transmitted through following layers comprising a packet data convergence protocol layer, a radio link control layer, a media access control layer and a physical layer, wherein the packet data convergence protocol layer is commonly used by the anchor radio access network element and the auxiliary radio access network element, the radio link control layer, the media access control layer and the physical layer are from the anchor radio access network element, or, the packet data convergence protocol layer and the radio link control layer are commonly used by the anchor radio access network element and the auxiliary radio access network element, the media access control layer and the physical layer are from the anchor radio access network element;
the packet assigned to the auxiliary radio access network element is transmitted through following layers comprising a packet data convergence protocol layer, a radio link control layer, a media access control layer and a physical layer, wherein the packet data convergence protocol layer is commonly used by the anchor radio access network element and the auxiliary radio access network element, the radio link control layer, the media access control layer and the physical layer are from the auxiliary radio access network element, or, the packet data convergence protocol layer and the radio link control layer are commonly used by the anchor radio access network element and the auxiliary radio access network element, the media access control layer and the physical layer are from the auxiliary radio access network element.

* * * * *

UNITED STATES PATENT AND TRADEMARK OFFICE
CERTIFICATE OF CORRECTION

| | | |
|---|---|---|
| PATENT NO. | : 9,560,547 B2 | |
| APPLICATION NO. | : 13/750233 | |
| DATED | : January 31, 2017 | |
| INVENTOR(S) | : Li et al. | |

It is certified that error appears in the above-identified patent and that said Letters Patent is hereby corrected as shown below:

In the Specification

Column 15, Line 50, "second third quality" should read -- third quality --.

Signed and Sealed this
Twenty-third Day of May, 2017

Michelle K. Lee
*Director of the United States Patent and Trademark Office*